(12) United States Patent
Gandhi et al.

(10) Patent No.: US 7,577,773 B1
(45) Date of Patent: Aug. 18, 2009

(54) METHOD AND SYSTEM FOR DMA OPTIMIZATION

(75) Inventors: Rajendra R. Gandhi, Laguna Niguel, CA (US); Kuangfu D. Chu, Irvine, CA (US); Jerald K. Alston, Coto de Caza, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 326 days.

(21) Appl. No.: 11/222,936

(22) Filed: Sep. 9, 2005

(51) Int. Cl.
*G06F 13/28* (2006.01)
(52) U.S. Cl. .......................... 710/22; 718/101
(58) Field of Classification Search .................... 710/22, 710/25, 35
See application file for complete search history.

(56) References Cited

U.S. PATENT DOCUMENTS

| | | | | |
|---|---|---|---|---|
| 5,287,486 A | * | 2/1994 | Yamasaki et al. | 710/22 |
| 5,584,040 A | * | 12/1996 | Curt et al. | 710/7 |
| 5,613,162 A | * | 3/1997 | Kabenjian | 710/22 |
| 6,678,749 B2 | * | 1/2004 | Kolli et al. | 710/5 |
| 7,024,523 B1 | * | 4/2006 | Young | 711/154 |
| 7,305,387 B2 | * | 12/2007 | Poyourow | 707/4 |
| 2003/0056032 A1 | * | 3/2003 | Micalizzi et al. | 710/5 |

* cited by examiner

*Primary Examiner*—Henry W. H. Tsai
*Assistant Examiner*—Elias Mamo
(74) *Attorney, Agent, or Firm*—Klein, O'Neill & Singh, LLP

(57) ABSTRACT

Method and system for processing read requests sent by a network interface device to a host system is provided. The method includes sending staggered read requests within a programmable time interval ("T"), wherein a transmit direct memory access (DMA) module sends more than one read request to the host system within the time interval T; placing data received from the host system in response to the read requests in independent slots of a transmit buffer; and unloading the transmit buffer slots based on an unload command, wherein the unload command is based on a mapping of read requests corresponding to transmit buffer slot locations where data from the host system is stored, and data is sent from the transmit buffer to a network device in the same order as the read requests that are sent from the network interface device to host system.

12 Claims, 8 Drawing Sheets

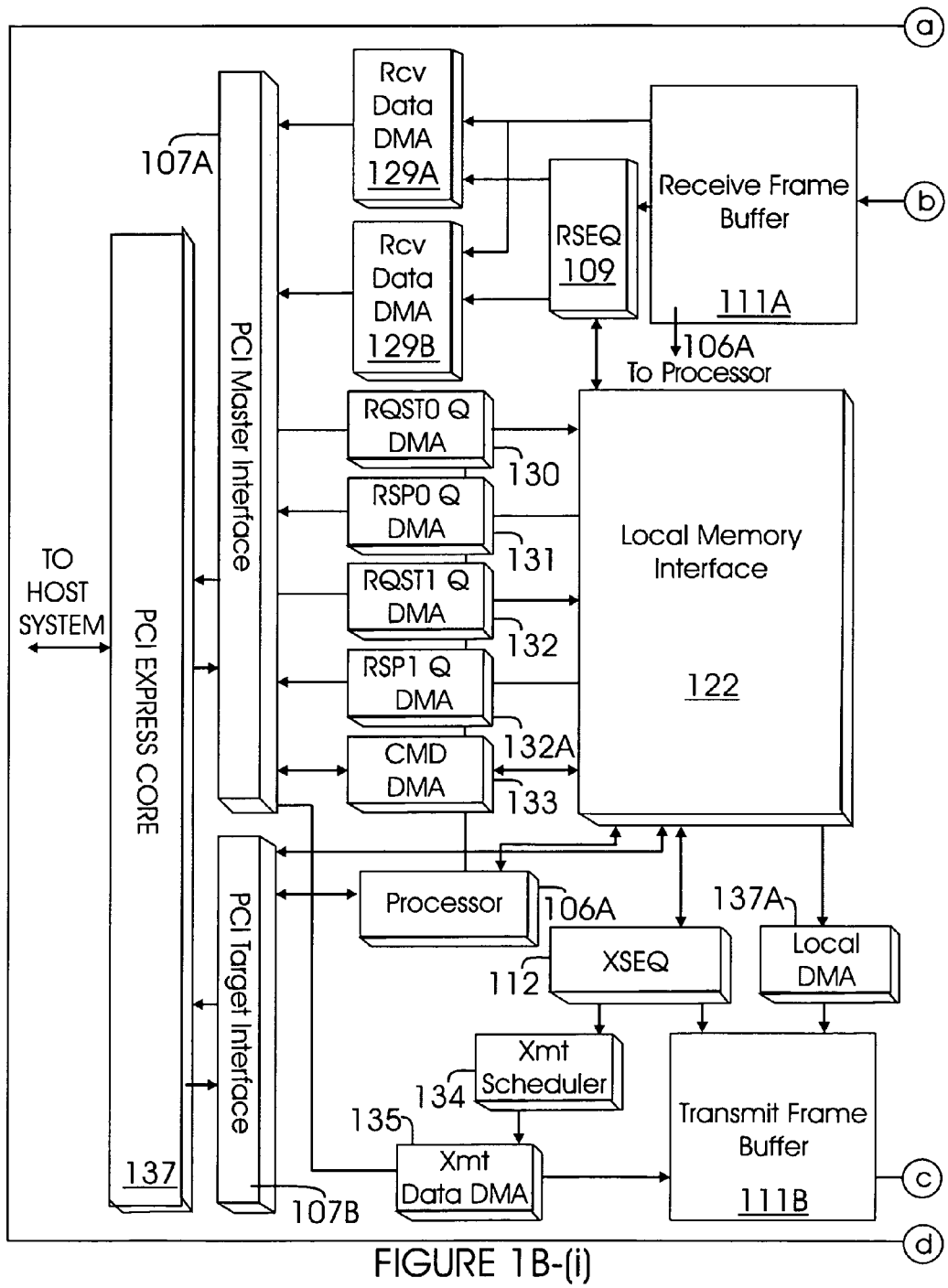
FIGURE 1B-(i)

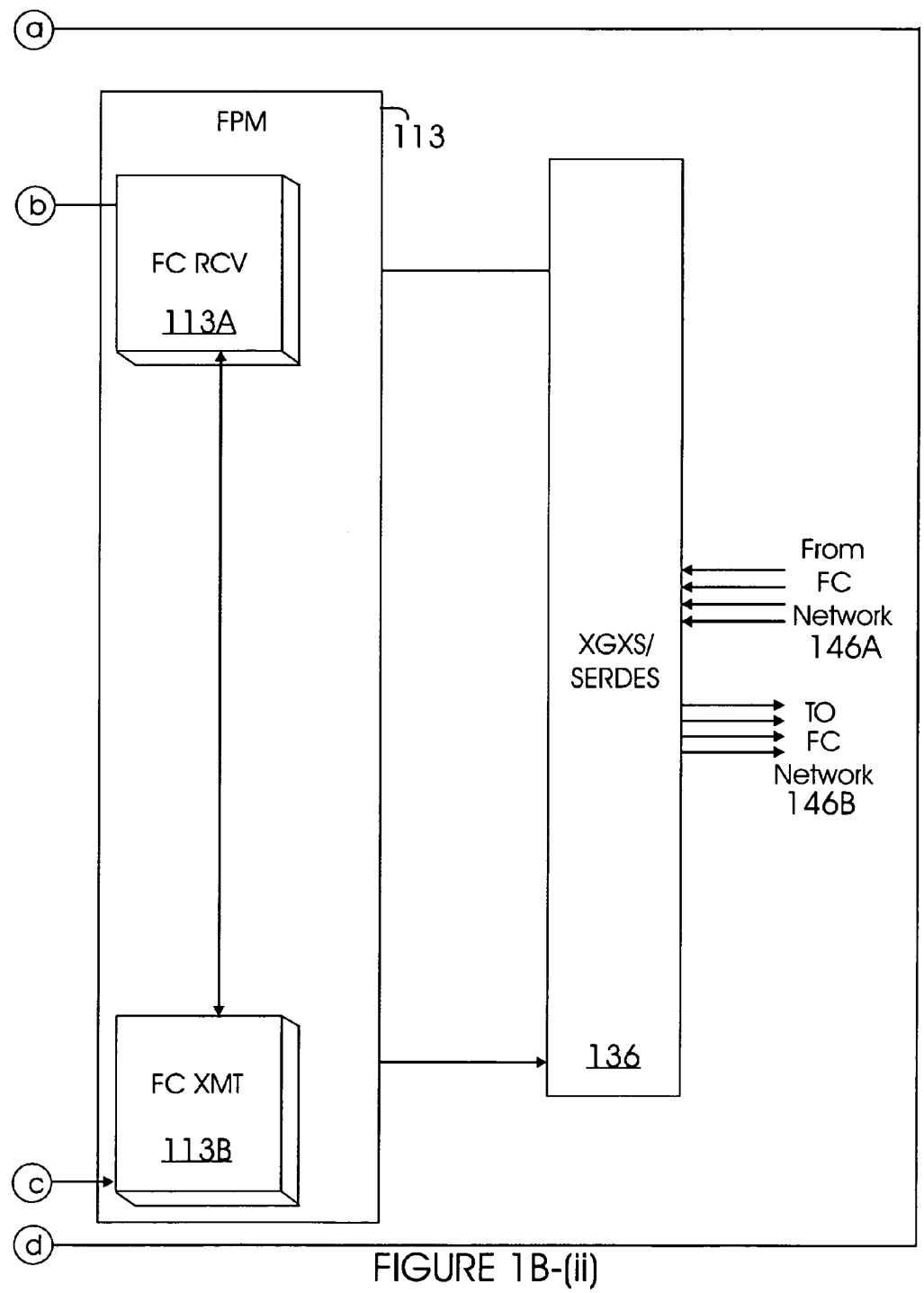
FIGURE 1B-(ii)

METHOD AND SYSTEM FOR DMA OPTIMIZATION

BACKGROUND

1. Field of the Invention

The present invention relates to computing systems, and more particularly, to efficiently processing direct memory access ("DMA") operations.

2. Background of the Invention

Computing systems typically include several functional components. These components may include a central processing unit (CPU), main memory, input/output ("I/O") devices, and streaming storage devices (for example, tape drives). In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

Host systems often communicate with peripheral devices via an interface such as the Peripheral Component Interconnect ("PCI") interface, a local bus standard using parallel data transfer that was developed by Intel Corporation®. The PCI standard is incorporated herein by reference in its entirety.

PCI-X is another bus standard that is compatible with existing PCI cards using the PCI bus. PCI-X improves the data transfer rate of PCI from 528 MBps to as much as 1 GBps. The PCI-X standard (incorporated herein by reference in its entirety) was developed by IBM®, Hewlett Packard Corporation® and Compaq Corporation® to increase performance of high bandwidth devices, such as Gigabit Ethernet standard and Fibre Channel Standard based devices.

More recently, PCI-Express, a standard interface incorporating PCI transaction protocols at the logical level, but using serial data transfer at the physical level has been developed to offer better performance than both the PCI or PCI-X standards. PCI-Express is an Input/Output ("I/O") bus standard (incorporated herein by reference in its entirety) that uses discrete logical layers to process inbound and outbound information.

Various other standard interfaces are also used to move data between host systems and peripheral devices. Fibre Channel is one such standard. Fibre Channel (incorporated herein by reference in its entirety) is an American National Standard Institute (ANSI) set of standards, which provides a serial transmission protocol for storage and network protocols.

Host systems are used in various network applications, including storage area networks ("SANs"). In SANs, plural memory storage devices are made available to various host computing systems. Data in a SAN is typically moved between plural host systems and storage systems (or storage devices, used interchangeably throughout this specification) through various controllers/adapters, for example, host bus adapters ("HBAs").

HBAs (a PCI/PCI-X/PCI-Express device) that are placed in SANs receive serial data streams (bit stream), align the serial data and then convert it into parallel data for processing. HBAs operate as a transmitting device as well as a receiving device.

DMA modules are used by HBAs to perform data transfers between host memory and storage devices without intervention from the host CPU. DMA modules provide address and control information to generate read and write accesses to host memory.

A DMA read request is a request from a DMA module (or channel) to transfer data from a host system to a storage device. A DMA write request is a request from a DMA module to transfer data from the storage device to a host system.

HBAs typically implement multiple DMA channels with an arbitration module that arbitrates for the access to a PCI/PCI-X bus or PCI-Express link. This allows an HBA to switch contexts between command, status and data. Multiple channels are serviced in periodic bursts.

A single DMA channel also typically breaks up large DMA data transfer request into smaller ones to comply with interface protocol requirements. Some of the factors affecting the break up of DMA request include payload size requirement and address boundary alignment on PCI-X/PCI-Express interface, and frame size negotiation on fibre channel interface and others.

The PCI-Express architecture, by design, treats DMA read request and resulting data return (transaction layer packet called Completion) as two separate transactions due to independent unidirectional transmit and receive links. The standard architecture has latency problems in completing read requests.

If a DMA channel breaks up read request for a large data transfer into multiple read requests of smaller sizes, the sequential nature of read requests coupled with access latencies in the host memory controller can considerably reduce the read data transfer throughput.

FIG. 1C illustrates the latency problem in PCI-X and/or PCI-Express systems (used interchangeably through out this specification). A first read request is received at time T0. The data for this request is received at time T1. Thereafter, a second read request from the same DMA channel is received at time T2 (after "Completion Transaction" for first read request is received at time T1) and data for that request is received at time T3. The latency is cumulative and reduces the overall efficiency of data transfer from a host system to the Fibre Channel network, via a HBA.

Therefore, there is a need for a method and system that can efficiently process read requests in PCI-X/PCI-Express host bus adapters and other similar devices.

SUMMARY OF THE INVENTION

In one aspect of the present invention, a method for processing read requests sent by a host bus adapter ("HBA") to a host system is provided. The method includes, sending staggered read requests within a programmable time interval ("T"), wherein a transmit direct memory access (DMA) module sends more than one read request to the host system within the time interval T; placing data received from the host system in response to the read requests in independent slots of a transmit buffer; and unloading the transmit buffer slots based on an unload command, wherein the unload command is based on a mapping of read requests corresponding to transmit buffer slot locations where data from the host system is stored, and data is sent from the transmit buffer to a Fibre Channel network device in the same order as the read requests that are sent from the HBA to host system.

In another aspect of the present invention, a host bus adapter (HBA) for transferring data from a host system to a Fibre Channel Network is provided. The HBA comprises of a transmit direct memory access module that sends more than one read request to the host system within a time interval ("T") for transferring data, wherein the read requests are staggered so that while one request is being processed, another request is in a pipeline, ready to be processed; a transmit buffer that includes independent memory slots for receiving out of order data from the host system in response to sequential read requests; and a transmit scheduler module that maintains a send queue, which is based on a mapping of read requests and transmit buffer slot locations where data in response to the read requests is stored, wherein the transmit scheduler module generates an unload command to transfer data from a particular slot of the transmit buffer and data is sent to the Fibre Channel network in a same order as the read requests.

In yet another aspect of the present invention, a Fibre Channel network with a host system is provided. The network includes a host bus adapter for transferring data from the host system to the Fibre Channel network, wherein the host bus adapter comprises of a transmit direct memory access module that sends more than one read request to the host system within a time interval ("T") for transferring data, wherein the read requests are staggered so that while one request is being processed, another request is in a pipeline, ready to be processed; a transmit buffer that includes independent memory slots for receiving out of order data from the host system in response to the read requests issued in a sequential order; and a transmit scheduler module that maintains a send queue, which is based on a mapping of read requests and transmit buffer slot locations where data in response to the read requests is stored, wherein the transmit scheduler module generates an unload command to transfer data from a particular slot of the transmit buffer and data is sent to the Fibre Channel network in a same order as the read requests.

In yet another aspect, a method for processing read requests sent by a network interface device to a host system is provided. The method includes sending staggered read requests within a programmable time interval ("T"), wherein a transmit direct memory access (DMA) module sends more than one read request to the host system within the time interval T; placing data received from the host system in response to the read requests in independent slots of a transmit buffer; and unloading the transmit buffer slots based on an unload command, wherein the unload command is based on a mapping of read requests corresponding to transmit buffer slot locations where data from the host system is stored, and data is sent from the transmit buffer to a network device in the same order as the read requests that are sent from the network interface device to host system.

In yet another aspect, a network interface device for transferring data from the host system to a network is provided. The device includes a transmit direct memory access module that sends more than one read request to the host system within a time interval ("T") for transferring data, wherein the read requests are staggered so that while one request is being processed, another request is in a pipeline, ready to be processed; a transmit buffer that includes independent memory slots for receiving out of order data from the host system in response to the read requests issued in a sequential order; and a transmit scheduler module that maintains a send queue, which is based on a mapping of read requests and transmit buffer slot locations where data in response to the read requests is stored, wherein the transmit scheduler module generates an unload command to transfer data from a particular slot of the transmit buffer and data is sent to the network in a same order as the read requests.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIGS. 1B(i)-1B(ii) (referred to as FIG. 1B) show a block diagram of a HBA, used according to one aspect of the present invention;

DETAILED DESCRIPTION OF THE PREFERRED EMBODIMENTS

To facilitate an understanding of the preferred embodiment, the general architecture and operation of a SAN, and a HBA will be described. The specific architecture and operation of the preferred embodiment will then be described with reference to the general architecture of the SAN and HBA.

Figure 1A:
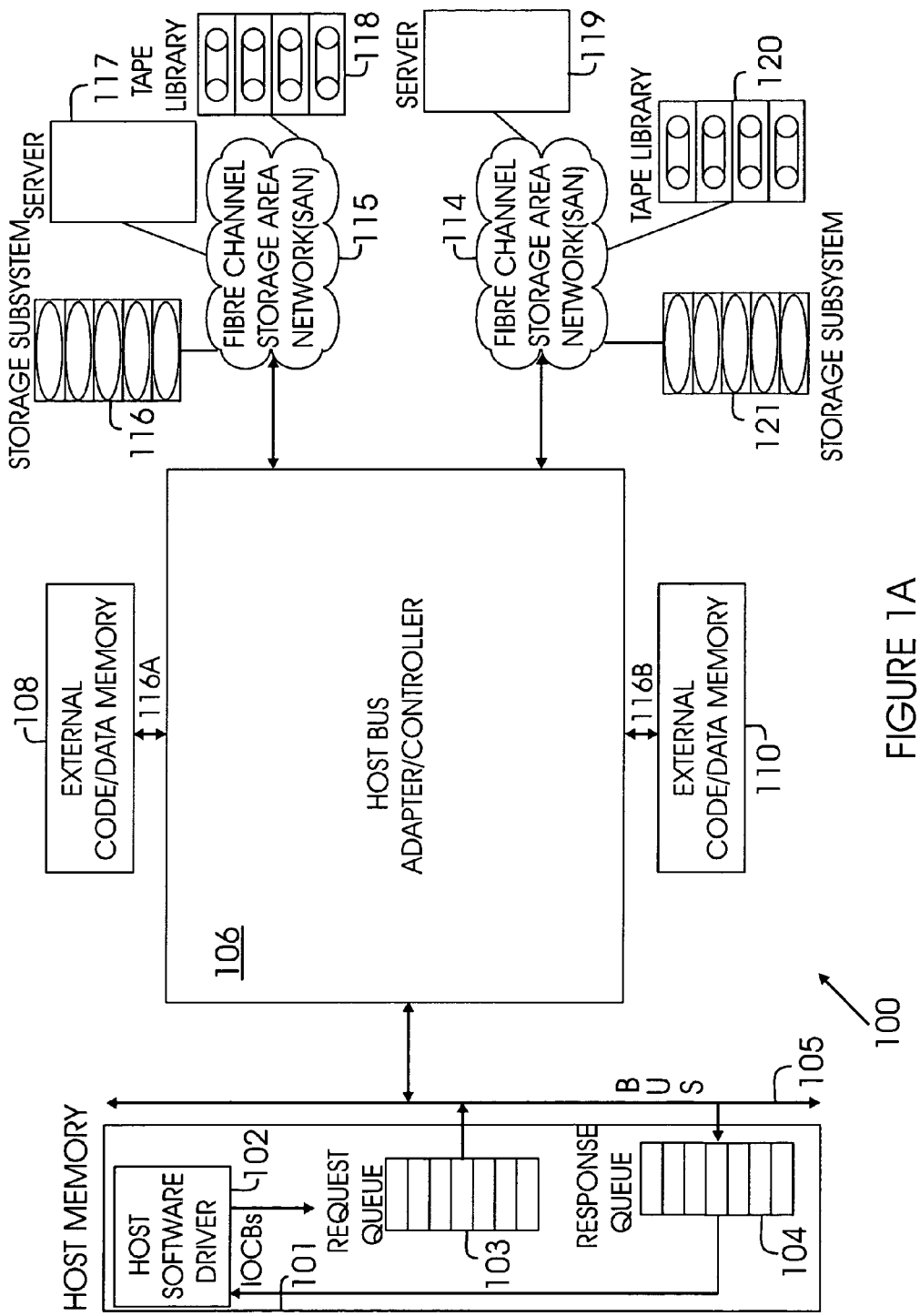
FIG. 1A shows a block diagram of a host system communicating with a device.

Host System/HBA:

FIG. 1A shows a SAN system 100 that uses a HBA 106 (referred to as "adapter 106") for communication between a host system with host memory 101 with various systems (for example, storage subsystem 116 and 121, tape library 118 and 120, and servers 117 and 120) using fibre channel storage area networks 114 and 115. The host system uses a driver 102 that co-ordinates data transfers via adapter 106 using input/output control blocks ("IOCBs").

A request queue 103 and response queue 104 is maintained in host memory 101 for transferring information using adapter 106. The host system communicates with adapter 106 via a bus 105 through an interface described below with respect to FIG. 1B.

FIG. 1B shows a block diagram of adapter 106. Adapter 106 includes processors (may also be referred to as "sequencers") "RSEQ" 109 and "XSEQ" 112 for receive and transmit side, respectively for processing data received from storage sub-systems and transmitting data to storage sub-systems. Transmit path in this context means data path from host memory 101 to the storage systems via adapter 106. Receive path means data path from storage subsystem via adapter 106. It is noteworthy, that only one processor is used for receive and transmit paths, and the present invention is not limited to any particular number/type of processors. Buffers 111A and 111B are used to store information in receive and transmit paths, respectively.

Besides dedicated processors on the receive and transmit path, adapter 106 also includes processor 106A, which may be a reduced instruction set computer ("RISC") for performing various functions in adapter 106.

Adapter 106 also includes fibre channel interface (also referred to as fibre channel protocol manager "FPM") 113 that includes modules 113A and 113B in receive and transmit paths, respectively (shown as "FC RCV" and "FC XMT"). Modules 113A and 113B allow data to move to/from storage systems and are described below in detail. Frames 146A are received from a fibre channel network, while frames 146B are transmitted to the fibre channel network.

Adapter 106 is also coupled to external memory 108 and 110 via connection 116A/116B (FIG. 1A) (referred interchangeably, hereinafter) and local memory interface 122. Memory interface 122 is provided for managing local memory 108 and 110. Local DMA module 137A is used for gaining access to a channel to move data from local memory (108/110). Adapter 106 also includes a serial/de-serializer (shown as "XGXS/SERDES") 136 for converting data from 10-bit to 8-bit format and vice-versa, and is described below in detail.

Adapter 106 also includes request queue DMA channel (0) 130, response queue (0) DMA channel 131, response queue (1) 132A, and request queue (1) DMA channel 132 that interface with request queue 103 and response queue 104; and a command DMA channel 133 for managing command information. DMA channels are coupled to an arbiter module (not shown) that receives requests and grants access to a certain channel.

Both receive and transmit paths have DMA modules "RCV DATA DMA" 129A and 129B and "XMT DATA DMA" 135 that are used to gain access to a channel for data transfer in the receive/transmit paths. Transmit path also has a scheduler 134 that is coupled to processor 112 and schedules transmit operations.

The host processor (not shown) sets up command/control structures in the host memory 101. These control structures are then transferred into the Local (or External) Memory 108 (or 110) by the local RISC processor 106A. The local RISC processor then executes them with the help of appropriate sequencer (i.e. 109 or 112).

PCI Express (or PCI-X) master interface 107A and PCI target interface 107B are both coupled to a PCI-Express Core (or PCI-X core) logic 137 (may also be referred to as "logic 137"). Logic 137 is coupled to a host system. Interface 107A and 107B include an arbitration module that processes DMA access to plural DMA channels.

DMA modules in general (for example, 135 that is described below) are used to perform transfers between memory locations, or between memory locations and an input/output port. A DMA module functions without involving a microprocessor by initializing control registers in the DMA unit with transfer control information. The transfer control information generally includes source address (the address of the beginning of a block of data to be transferred), the destination address, and the size of the data block.

Figure 1C:
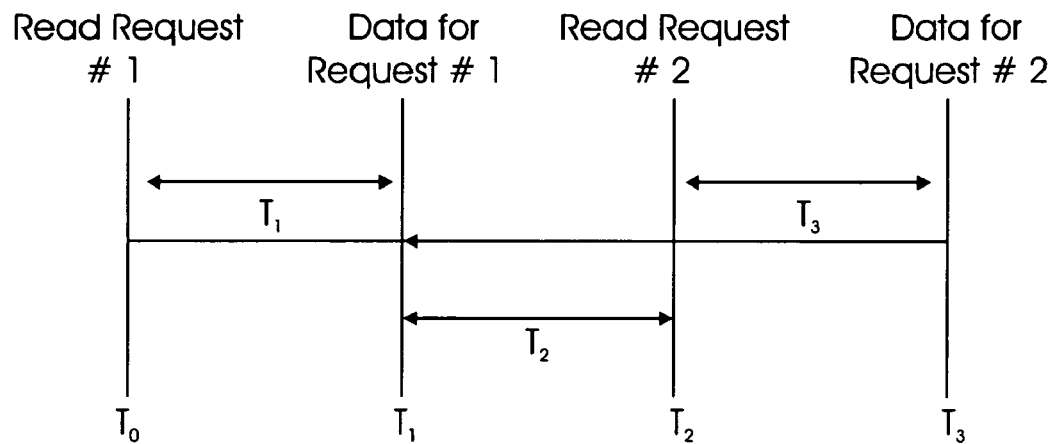
FIG. 1C shows a latency example in processing read requests in PCI-X/PCI-Express environment.
Figure 3B:
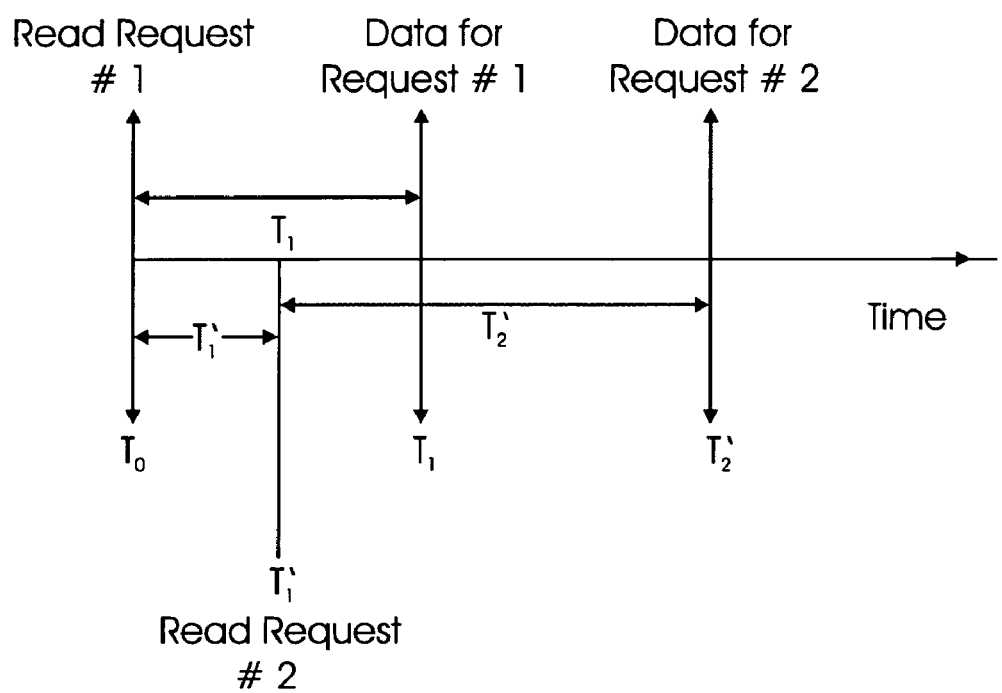
FIG. 3B illustrates how latency is reduced by using the process flow of FIG. 3A, according to one aspect of the present invention.

Processing Read Requests:

In one aspect of the present invention, more than one read requests are sent within a time interval ("T") to the host system so that overall system latency is reduced. The read requests are staggered so that while one request is being processed, another request is received in the pipeline. This is shown in FIG. 3B, a first read request, request 1 is sent at time T0 and the second read request, request 2 is sent at time T1' before request 1 is completed at time T1. In this case request 2 is completed at time T2', which is sooner than the time it takes to process the second request in a conventional system, as shown in FIG. 1C, i.e., T1+T2+T3 is greater than T1'+T2'. The time interval T1' (which is equal to T shown in FIG. 3A, S300) can be programmed by adapter 106 firmware so that overall data transfer occurs efficiently with minimum delay/latency.

Figure 2A:
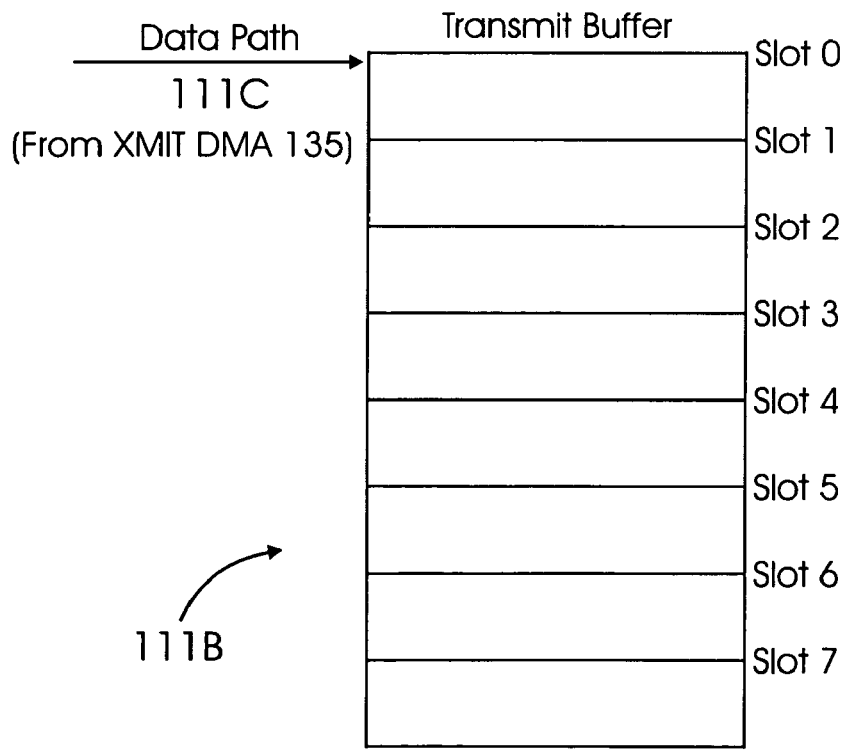
FIG. 2A shows a block diagram of a transmit buffer used by a HBA to transmit frames to a Fibre Channel network.

FIG. 2A shows a data path 111C where data is sent by the host system and then stored in transmit buffer 111B. Data coming from the host may come in out of order with respect to the read requests being issued by the HBA 106. For example, the data for the first read request may be received in the transmit buffer 116B after the data for a second request is received. Since data may be received out of order, it is re-ordered before being sent out to the Fibre Channel network, as described below in more detail.

Figure 2B:
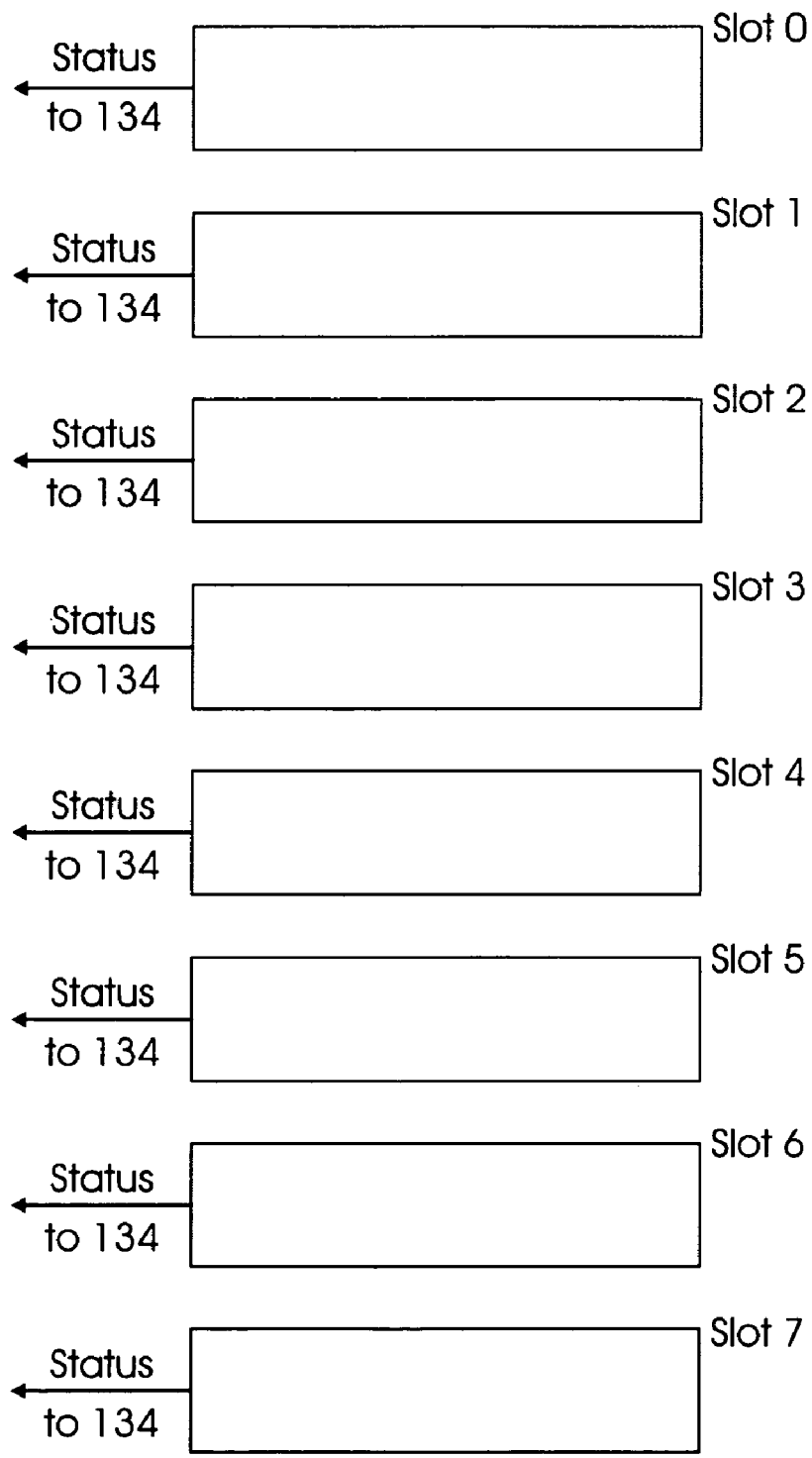
FIG. 2B shows a block diagram with individual transmit buffer slots, used according to one aspect of the present invention.

Transmit buffer 111B has various slots (shown as 0-7). Each slot operates independently, i.e. read and written independently. FIG. 2B shows examples of slots 0-7 of transmit buffer 111B. A status is sent to scheduler 134 when a particular slot is ready to be written. Scheduler 134 schedules a write operation, when a slot is ready to be written. A read operation is based on a send queue that is described below with respect to FIG. 2C.

Figure 2C:
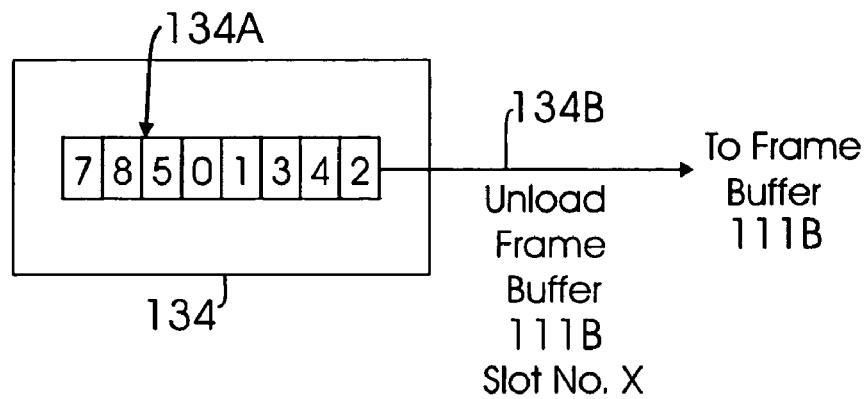
FIG. 2C shows a block diagram of a send queue used to unload transmit buffer slots so that data can be sent to a Fibre Channel network in order, according to one aspect of the present invention.

FIG. 2C shows a control path that is based on a send queue (or send queue module) 134A in transmit scheduler 134. The send queue 134A sends an unload command 134B to Transmit Frame Buffer 111B. The unload command 134B ensures that a proper slot from the Transmit Frame Buffer 111B is read so that data is sent out (146B, FIG. 1B) to the Fibre Channel network in order.

The send queue 134A maintains a mapping table where a read request number is mapped to the actual slot where the data is located in Transmit Frame Buffer 111B. Based on this information, send queue 134A generates the control command (unload command) 134B to unload a particular slot. For example, as shown in FIG. 2C, slot 2, slot 4, slot 3, slot 1, slot 0, slot 5, slot 8 and slot 7 store data for read requests, 1, 2, 3, 4, 5, 6, 7 and 8 respectively. Hence first slot 2 is unloaded and data from slot 2 is sent to the fibre channel network. Thereafter, slot 4 and slot 3 are unloaded. This process continues until all the slots are emptied and data is sent out in order. It is noteworthy that when a slot becomes empty, a status signal, as shown in FIG. 2B, is sent to scheduler 134.

Figure 3A:
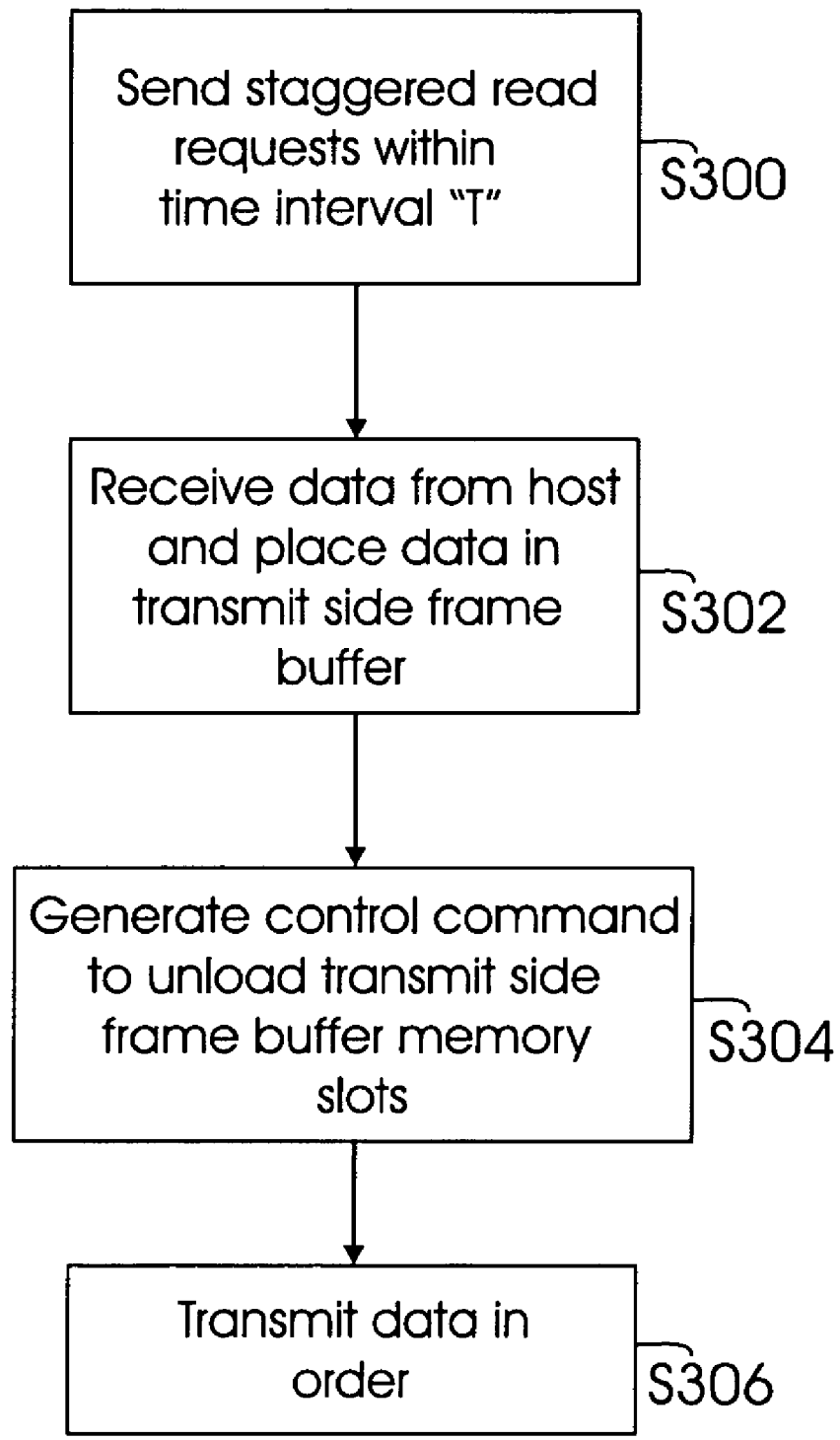
FIG. 3A shows a flow diagram of process steps for processing read requests, according to one aspect of the present invention.

FIG. 3A shows a process diagram for processing read requests using a HBA or any other PCI Express device for processing read requests sent by a host bus adapter ("HBA") to a host system is provided. The process steps include the steps of breaking up large transfer request into multiple smaller ones; sending staggered read requests within a programmable time interval ("T"), and reordering the received data as necessary so that they are transmitted on the fibre channel network in the same order that the read requests were generated Turning in detail to FIG. 3A, in step S300, at least two read requests are sent within a pre-defined time interval "T". FIG. 3B shows an example of how the read requests are timed. A first read request, request 1 is sent at time T0 and the second read request, request 2 is sent at time T1' (where T1'=T). The value of T can be programmed by processor 106A so that read request processing can be optimized.

In step S302, data is received from the host system and placed in transmit buffer 111B. As described above, data is placed in independent slots of Transmit Frame Buffer 111B (shown in FIG. 2A). The data received by Transmit Frame Buffer 111B may or may not be in the same order as the read requests. However, data that is sent out to the Fibre Channel network needs to be in order, therefore, in step S304, a control command (134B) is generated to unload the appropriate slot so that data can be sent out in order.

In step S306, the data is transmitted in sequence from the Transmit Frame Buffer 111B based on the control signal generated by transmit scheduler 134 that is also described above with respect to FIG. 2C.

By staggering the read requests within an optimum time interval ("T") allows the host system and HBA 106 to process read request efficiently without unnecessary latency and delays.

Figure 4:
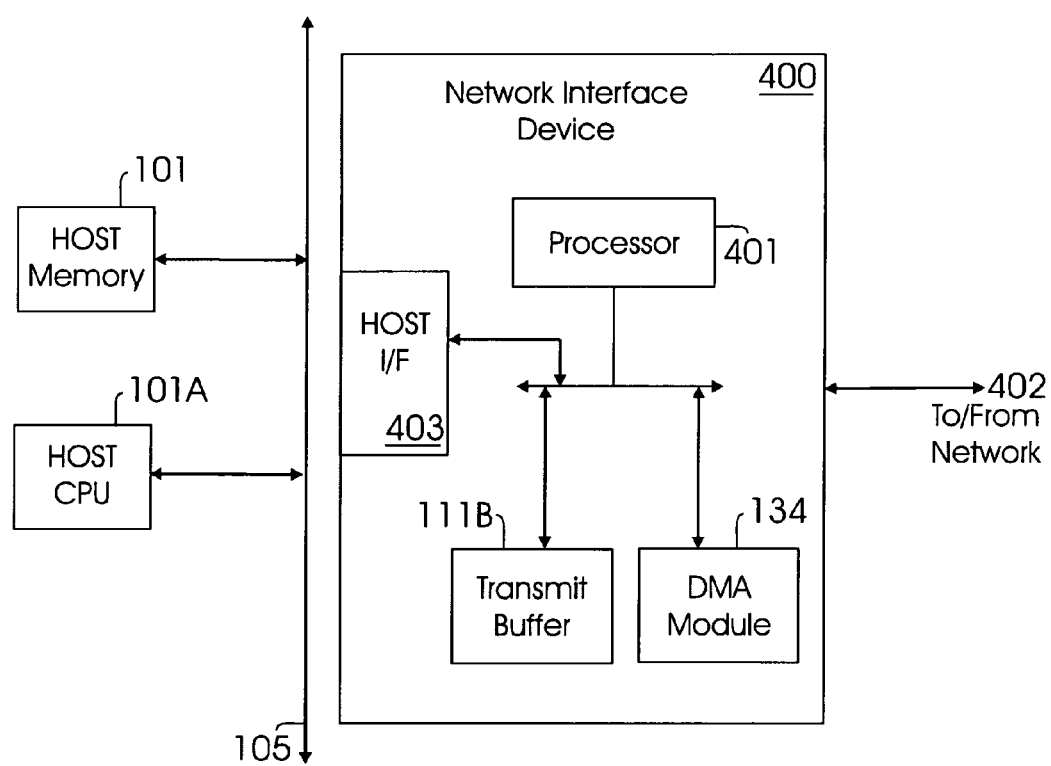
FIG. 4 shows a block diagram of a generic network interface device, used according to one aspect of the present invention.

The foregoing examples have been shown with respect to a HBA in a SAN. However, the adaptive aspects of the present invention are applicable in a more generic manner. An example of one such architecture is shown in FIG. 4 where a network interface device 400 is coupled to a host CPU 101A and a host memory 101 via a bus 105 (PCI-Express or any other bus that has this latency issue). Device 400 interfaces with host CPU 101A via a host interface 403.

Device 400 includes transmit buffer 111B, DMA module 134 and a processor 401 (similar to processor 106A). Traffic 402 is sent/received from a network. Transmit buffer 111B and DMA module 134 (that also includes a scheduler 135 (not shown) performs similar function that has been described above. The process used for improving read request handling/processing is similar to the process described above with respect to FIG. 3A.

Staggering read requests within an optimum time interval ("T") allows the host system and device 400 to process read requests efficiently without unnecessary latency and delays.

Although the present invention has been described with reference to specific embodiments, these embodiments are illustrative only and not limiting. Many other applications and embodiments of the present invention will be apparent in light of this disclosure and the following claims.

What is claimed is:

1. A method for processing read requests sent by a host bus adapter ("HBA") to a host system for transferring data stored from a host system memory to a device, accessible to the HBA via a network connection, comprising:

(a) sending a first read request and at least a second read request within a programmable time interval ("T") to the host system, for transferring data from the host system memory;

wherein the second read request is sent after the first read request is sent to the host system but before the first read request is processed by the host system and data associated with the first read request is transferred;

wherein a transmit direct memory access (DMA) module sends the first read request and the second read request to the host system, staggered within the time interval T; and wherein the first read request and the second read request are a part of a data transfer request, such that a transfer size for the data transfer request is larger than a transfer size for each of the first read request and the second read request;

(b) receiving data from the host system in any order, in response to the first read request and the second read request;

(c) placing the received data in response to both the first read request and the second read request in independent slots of a transmit buffer; and (d) unloading the independent transmit buffer slots based on an unload command, such that data associated with the first read request is sent to the device before data associated with the second read request is sent, even though data associated with the second read request is received at one or more of the independent transmit buffer slots before data associated with the first read request is received.

2. The method of claim 1, wherein the device is a Fibre Channel device and the unload command is sent by a transmit scheduler module that schedules transmit operations to transfer data from the host system to the Fibre Channel network device via the transmit buffer.

3. The method of claim 2, wherein the transmit scheduler module maintains a send queue based on which the unload command is generated.

4. A host bus adapter for transferring data from a host system to a Fibre Channel Network, comprising:

a transmit direct memory access module for sending a first read request and at least a second read request to the host system within a time interval ("T") for transferring data to the Fibre Channel network; wherein the first read request and the second read request are staggered within the time interval T such that the second read request is sent after the first request and while the first request is being processed by the host system;

wherein the first read request and the second read request are a part of a data transfer request, such that a transfer size for the data transfer request is larger than a transfer size for each of the first read request and the second read request;

a transmit buffer that includes independent memory slots for receiving data from the host system in any order, in response to both the first read request and the second read request; and a transmit scheduler module that generates an unload command to transfer data from the independent memory slots to the Fibre Channel network such that data associated with the first read request is sent to the Fibre Channel network, before data associated with the second read request is sent, even though data associated with the second read request is received at one or more of the independent memory slots, before the data associated with the first read request is received.

5. The host bus adapter of claim 4, wherein a status signal indicates to the transmit scheduler module to write to a particular slot in the transmit buffer.

6. The host bus adapter of claim 5, wherein the time interval T is programmable.

7. A network interface device for transferring data from a host system to a network, comprising:

a transmit direct memory access module for sending a first read request and at least a second read request to the host system, within a time interval ("T") for transferring data to the network; wherein the first read request and the second read request are staggered within the time interval T such that the second read request is sent after the first request and white the first read request is being processed by the host system;

wherein the first read request and the second read request are a part of a data transfer request, such that a transfer size for the data transfer request is larger than a transfer size for each of the first read request and the second read request;

a transmit buffer that includes independent memory slots for receiving data from the host system in any order, in response to both the first read request and the second read request; and a transmit scheduler module that generates an unload command to transfer data from the independent memory slots to the network such that data associated with the first read request is sent to the network, before data associated with the second read request is sent, even though data associated with the second read request is received at one or more of the independent memory slots, before the data associated with the first read request is received.

8. The network interface device of claim 7, wherein a status signal indicates to the transmit scheduler module to write to a particular slot from among the independent memory slots of the transmit buffer.

9. The network interface device of claim 7, wherein the time interval T is programmable.

10. A method for processing read requests sent by a network interface device to a host system for transferring data from a host system memory to a device operationally coupled to the network interface device, comprising:

(a) sending staggered read requests to the host system within a programmable time interval ("T") such that a second read request from among the staggered read requests is sent after a first read request but before the first read request is processed by the host system, wherein a transmit direct memory access (DMA) module sends the staggered read requests to the host system within the time interval T such that while one read request is being processed, another read request is ready for processing within the time interval T;

wherein the staggered read requests are a part of a data transfer request, such that a transfer size for the data transfer request is larger than a transfer size for each of the staggered read requests;

(b) receiving data from the host system in any order, in response to the staggered read requests and (c) placing the data in independent slots of a transmit buffer; and unloading the independent transmit buffer slots based on an unload command, such that data associated with the first read request is sent to the network device before data associated with the second read request is sent, even though data associated with the second read request is received at one or more of the independent transmit buffer slots before the data associated with the first read request is received.

11. The method of claim 10, wherein the unload command is sent by a transmit scheduler module that schedules transmit operations to transfer data from the host system to the network device via the transmit buffer.

12. The method of claim 11, wherein the transmit scheduler module maintains a send queue based on which the unload command is generated.

* * * * *

UNITED STATES PATENT AND TRADEMARK OFFICE
CERTIFICATE OF CORRECTION

PATENT NO.       : 7,577,773 B1
APPLICATION NO.  : 11/222936
DATED            : August 18, 2009
INVENTOR(S)      : Rajendra R. Gandhi et al.

It is certified that error appears in the above-identified patent and that said Letters Patent is hereby corrected as shown below:

In column 8, line 61, in claim 7, delete "white" and insert -- while --, therefor.

Signed and Sealed this

Nineteenth Day of October, 2010

David J. Kappos
*Director of the United States Patent and Trademark Office*